US012123887B2

(12) United States Patent
Nakayama et al.

(10) Patent No.: US 12,123,887 B2
(45) Date of Patent: Oct. 22, 2024

(54) SAMPLE ANALYZING DEVICE

(71) Applicant: HORIBA Advanced Techno, Co., Ltd., Kyoto (JP)

(72) Inventors: Hideki Nakayama, Kyoto (JP); Kazuya Nakagawa, Kyoto (JP); Hiroshi Iida, Kyoto (JP); Yoko Nakai, Kyoto (JP)

(73) Assignee: HORIBA ADVANCED TECHNO, CO., LTD., Kyoto (JP)

( * ) Notice: Subject to any disclaimer, the term of this patent is extended or adjusted under 35 U.S.C. 154(b) by 416 days.

(21) Appl. No.: 16/613,296

(22) PCT Filed: Jul. 17, 2018

(86) PCT No.: PCT/JP2018/026788
§ 371 (c)(1),
(2) Date: Nov. 13, 2019

(87) PCT Pub. No.: WO2019/013359
PCT Pub. Date: Jan. 17, 2019

(65) Prior Publication Data
US 2021/0116470 A1 Apr. 22, 2021

(30) Foreign Application Priority Data

Jul. 14, 2017 (JP) ................................ 2017-138552

(51) Int. Cl.
G01N 35/04 (2006.01)
B01L 3/00 (2006.01)
(Continued)

(52) U.S. Cl.
CPC ............ G01N 35/04 (2013.01); B01L 3/5082 (2013.01); B01L 9/06 (2013.01); G01N 21/6428 (2013.01);
(Continued)

(58) Field of Classification Search
CPC ............... G01N 35/04; G01N 21/6428; G01N 35/1002; G01N 2035/103; G01N 21/76;
(Continued)

(56) References Cited

U.S. PATENT DOCUMENTS 5,291,997 A * 3/1994 He ........................... B01L 9/06
206/370
6,098,802 A * 8/2000 Asa ......................... B01L 9/543
206/443

(Continued)

FOREIGN PATENT DOCUMENTS

CA 2022373 A1 2/1991
JP H61047565 A 3/1986
(Continued)

OTHER PUBLICATIONS

ISA Japan Patent Office, International Search Report Issued in International Application No. PCT/JP2018/026788, Aug. 28, 2018, WIPO, 3 pages.

(Continued)

Primary Examiner — Jill A Warden
Assistant Examiner — John McGuirk
(74) Attorney, Agent, or Firm — Alleman Hall & Tuttle LLP

(57) ABSTRACT

The present invention is one for achieving an improvement in analysis accuracy, and a sample analyzing device that measures light emitted by introducing a reagent to a sample contained in a container to analyze the sample, and the sample analyzing device includes: a holder that holds the container; a casing that has a door for taking in/out the holder; a nozzle to/from which a pipette tip for injecting the reagent into the container can be attached/detached; a photodetector that measures the light emitted from the sample in the container supported by the holder; and a disposal box (Continued)

into which the pipette tip after injection is disposed of, in which the disposal box is configured to be arranged in the casing and to be taken in/out via the door.

8 Claims, 8 Drawing Sheets

(51) Int. Cl.
 *B01L 9/06* (2006.01)
 *G01N 21/64* (2006.01)
 *G01N 35/10* (2006.01)
(52) U.S. Cl.
 CPC ...... *G01N 35/1002* (2013.01); *B01L 2200/04* (2013.01); *B01L 2200/0605* (2013.01); *B01L 2300/0609* (2013.01); *B01L 2300/08* (2013.01); *G01N 2035/103* (2013.01)
(58) Field of Classification Search
 CPC ............ G01N 35/1009; G01N 35/1016; B01L 3/5082; B01L 9/06; B01L 2200/04; B01L 2200/0605; B01L 2300/0609; B01L 2300/08
 See application file for complete search history.

(56) References Cited

U.S. PATENT DOCUMENTS

| | | | |
|---|---|---|---|
| 6,241,947 B1 | 6/2001 | Komatsu et al. | |
| 6,286,678 B1* | 9/2001 | Petrek | B01L 9/543 422/526 |
| 6,413,780 B1 | 7/2002 | Bach et al. | |
| 2003/0026733 A1 | 2/2003 | LaCourt et al. | |
| 2004/0096365 A1* | 5/2004 | Toi | G01N 35/1011 422/502 |
| 2004/0230400 A1* | 11/2004 | Tomasso | G01N 35/00029 702/183 |
| 2006/0204997 A1 | 9/2006 | Macioszek et al. | |
| 2008/0023423 A1* | 1/2008 | Duffy | A47B 73/004 211/88.01 |
| 2009/0130745 A1 | 5/2009 | Williams et al. | |
| 2011/0008825 A1 | 1/2011 | Ingber et al. | |
| 2014/0112839 A1* | 4/2014 | Richardson | G01N 35/0099 422/511 |

FOREIGN PATENT DOCUMENTS

| | | | | |
|---|---|---|---|---|
| JP | H06242122 A | | 9/1994 | |
| JP | H08094506 A | | 4/1996 | |
| JP | H09127129 A | | 5/1997 | |
| JP | H10311837 A | | 11/1998 | |
| JP | 2000275258 A | | 10/2000 | |
| JP | 2001165936 A | | 6/2001 | |
| JP | 3267117 B | | 3/2002 | |
| JP | 2003075452 A | | 3/2003 | |
| JP | 2004101290 A | | 4/2004 | |
| JP | 2004340969 A | | 12/2004 | |
| JP | 2006167569 A | * | 6/2006 | |
| JP | 2007316010 A | | 12/2007 | |
| JP | 2010175420 A | | 8/2010 | |
| JP | 2011099808 A | | 5/2011 | |
| JP | 2016024054 A | | 2/2016 | |
| JP | 2016024055 A | * | 2/2016 | ........... G01N 35/021 |

OTHER PUBLICATIONS

European Patent Office, Extended European Search Report Issued in Application No. 18831045.2, Jan. 19, 2021, Germany, 8 pages.
Japan Patent Office, Office Action Issued in Application No. 2019-529825, Dec. 23, 2021, 8 pages.
European Patent Office, Office action issued in Application No. 18831045.2, Sep. 1, 2022, Netherlands, 7 pages.
Japan Patent Office, Decision to Grant a Patent issued in Application No. 2019-529825, Sep. 26, 2022, 5 pages.
China National Intellectual Property Administration, Office action issued in Chinese Application No. 201880032389.4, Feb. 2, 2023, 26 pages.
China National Intellectual Property Administration, Office Action and Search Report Issued in Application No. 201880032389.4, Aug. 11, 2023, 24 pages.

* cited by examiner

SAMPLE ANALYZING DEVICE

TECHNICAL FIELD

The present invention relates to a sample analyzing device that measures light emitted by introducing a reagent to a sample contained in a container to analyze the sample.

BACKGROUND ART

In the past, microbiological monitoring has been performed for environmental management of pharmaceutical manufacturing plants, food plants, and the like. As an example of the microbiological monitoring, there is a method that adds luciferase as a luminescent reagent to ATP (adenosine triphosphate) contained in microorganisms to measure the resulting bioluminescence and converts the resulting luminescence intensity into a bacterial count.

As a device for measuring the ATP content, one disclosed in Patent Literature 1 has been conceived. This sample analyzing device includes a nozzle for weighing a reagent such as reaction solution to introduce it into a container, and at the tip of the nozzle, a disposable pipette tip is replaceably attached, and after use, disposed of into a disposal box. In addition, the disposal box is of a drawer structure drawable from the front of a main body.

However, in such a configuration, external light enters the main body through gaps of the drawing structure to cause noise and adversely influence a photodetector. In addition, when the drawer is carelessly opened during measurement as well, the same problems occur. As a result, analysis accuracy is deteriorated.

CITATION LIST

Patent Literature

Patent Literature 1
Japanese Patent No. 3267117

SUMMARY OF INVENTION

Technical Problem

Therefore, the present invention has been made in order to solve the above-described problems, and the main object thereof is to achieve an improvement in analysis accuracy.

Solution to Problem

That is, the sample analyzing device according to the present invention is a sample analyzing device that measures light emitted by introducing a reagent to a sample contained in a container to analyze the sample, and includes: a holder that holds the container; a casing that has a door for taking in/out the holder; a nozzle to/from which a pipette tip for injecting the reagent into the container can be attached/detached; a photodetector that measures the light emitted from the sample in the container supported by the holder; and a disposal box into which the pipette tip after injection is disposed of, in which the disposal box is configured to be arranged in the casing and to be taken in/out via the door.

In such a sample analyzing device, since the disposal box is configured to be arranged in the casing and to be taken in/out via the door, the need for providing the main body of the device with a drawer structure for drawing the disposal box is eliminated, and external light can be surely shielded. As a result, an improvement in the analysis accuracy of the sample analyzing device can be achieved.

In particular, it is desirable that the disposal box is provided to the holder. In this configuration, the disposal box is taken in/out together with the holder via the door. A dead space other than a container holding part in the holder can be effectively used, and therefore the device can be made compact. Also, since the dead space other than the container holding part in the holder can be effectively used, the device can be made compact.

As a specific configuration of the holder, one that holds multiple containers, as well as holds them in a ring-shaped manner is conceivable. Note that holding in a ring-shaped manner by the holder includes, in addition to holding so that the arrangement of the multiple containers is of a circular shape, holding so that the arrangement of them is of a rectangular shape, a polygonal shape, or an elliptical shape, and the like. Besides, the holder only has to be one that holds the multiple containers in an aspect in which, on the inner side of an arrangement area of the multiple containers, it has an area where no container is arranged.

In this configuration, the inner side of the multiple containers in the holder serves as a dead space. In order to effectively use the dead space, it is desirable that the disposal box is provided on the inner side of the multiple containers in the holder. Also, since the holder holds the multiple containers, the frequency of opening/closing the door to replace a container can be reduced, and the time necessary to stabilize the photodetector before measurement, and the like can be shortened to shorten the measurement time of the multiple containers.

By rotating the holder around a predetermined rotation center to make the holder serve as a turntable, a container to be measured can be easily switched without moving an optical measurement system such as the photodetector. At this time, the holder is configured to hold the multiple containers in a circular ring-shaped manner.

In this configuration, it is desirable that the disposal box has an arc-shaped opening along the arrangement direction of the multiple containers in a plan view. In this configuration, pipette tips to be disposed of into the disposal box can be wholly dispersed using the holder rotation configuration, making it possible to prevent them from being unevenly distributed in one position to get out of the disposal box.

When disposing of multiple pipette tips into an internal space of the disposal box, pipette tips already disposed of are obstructive, and a pipette tip attached to the nozzle cannot be detached, or a problem (e.g., the step-out of a motor) may occur in an actuator as a moving mechanism for moving the nozzle.

In order to solve this problem, it is desirable that in the disposal box, a disposal spaces is separated for each pipette tip to be disposed of.

In this configuration, since the disposal space is separated for each pipette tip, pipette tips already disposed of are never obstructive, and a pipette tip can be smoothly disposed of. Also, since pipette tips disposed of into the disposal box are in a state of being mutually separated, the work of taking out disposed pipette tips from the disposal box is facilitated, and further for example, the work of removing waste liquid remaining in pipette tips from the pipette tips is also facilitated.

In order to prevent a pipette tip from tilting in each disposal space to obstruct a pipette tip to be disposed of into an adjacent disposal space, it is desirable that the disposal space has: an opening part opened in the upper surface of the disposal box; and a narrowed part that is formed below the opening part and whose opening area is smaller than the opening part. Also, by preventing a pipette tip from tilting in each disposal space, the work of taking out disposed pipette tips from the disposal box can be facilitated.

By separating the disposal box into the multiple disposal spaces, with respect to a predetermined position at which a pipette tip to be disposed of, the positional adjustment of the nozzle and the positional adjustment of a tip detachment member for detaching a pipette tip attached to the nozzle are respectively required.

In order to simplify these positional adjustments, it is desirable to include: a holding unit that holds the nozzle, as well as moves in the horizontal direction; the tip detachment member that is provided to the holding unit to move together with the nozzle and moves between a detachment position to detach the pipette tip attached to the nozzle and a withdrawal position withdrawn therefrom; and an actuator that, in a state where the holding unit is in a predetermined position, operates the tip detachment member to move the tip detachment member from the withdrawal position to the detachment position.

By configuring the disposal box to be taken in/out with respect to the device main body via the door, there is a possibility of forgetting to set the disposal box in the device main body. In order to solve this problem, it is desirable to include a detection mechanism that detects the presence or absence of the disposal box in the casing.

Advantageous Effects of Invention

According to the present invention configured as described, the need for providing the main body of the device with a drawer structure for drawing the disposal box is eliminated, and external light can be surely shielded, thus making it possible to achieve an improvement in analysis accuracy.

REFERENCE CHARACTERS LIST

100 Sample analyzing device
C Casing
C2 Door
2 Container
3 Holder
4 Photodetector
61 Nozzle
PT Pipette tip
10 Disposal box
10x Opening

DESCRIPTION OF EMBODIMENTS

In the following, one embodiment of the sample analyzing device according to the present invention will be described with reference to the drawings.

<Device Configuration>

A sample analyzing device 100 of the present embodiment is one that analyzes light emitted from an organism-derived substance contained in a sample and thereby measures the content of the organism-derived substance. Note that, in the following, an ATP content measuring device that measures the content (amol (=$10^{-18}$ mol)) of ATP (adenosine triphosphate) as the organism-derived substance will be described.

Figure 1:
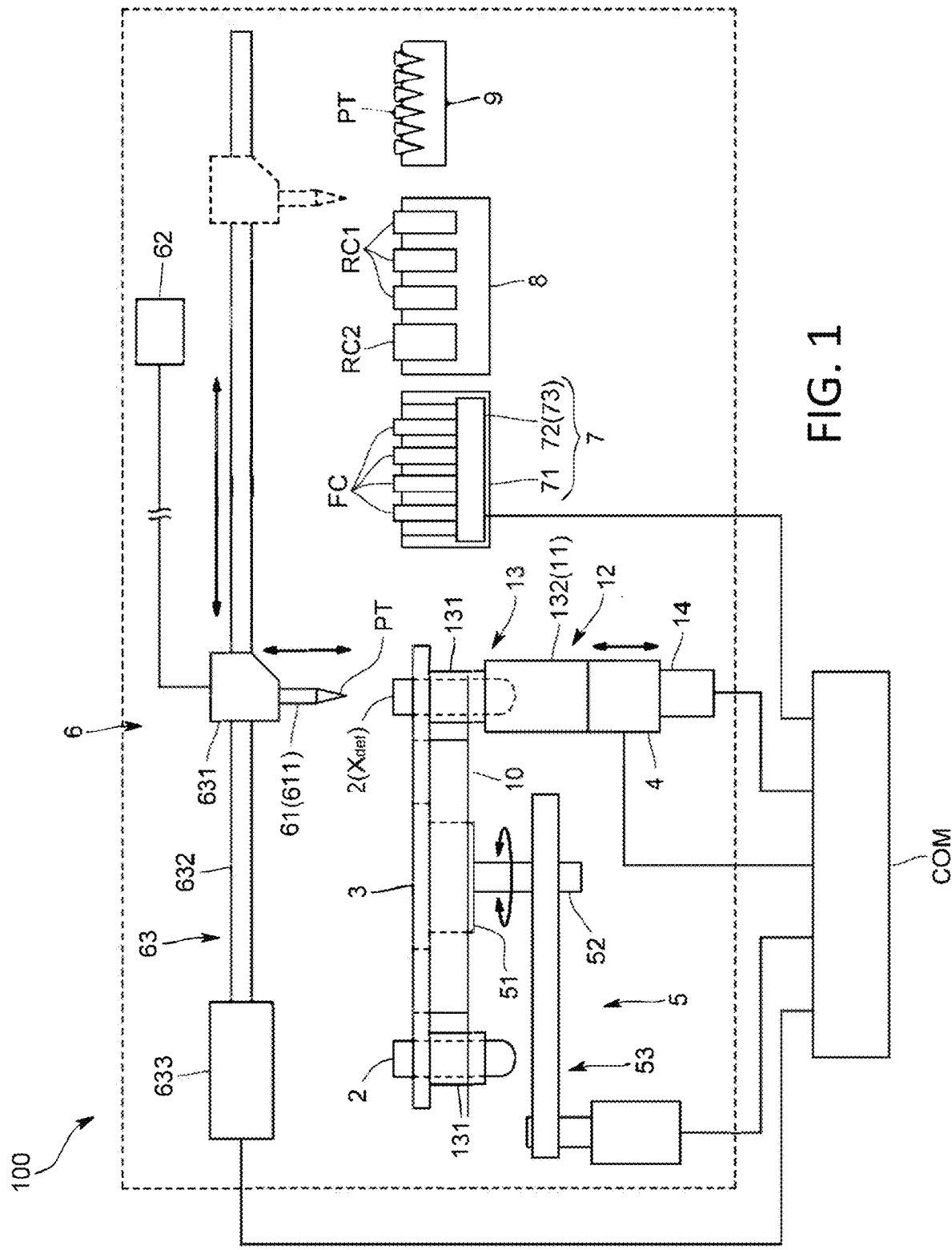
FIG. 1 is a schematic diagram illustrating the configuration of a biological sample analyzing device according to the present embodiment.

Specifically, as illustrated in FIG. 1, the sample analyzing device 100 includes: a holder 3 that holds multiple containers 2 for containing the sample; a photodetector 4 fixed at a predetermined position; a holder driving mechanism 5 that moves the holder 3; and a dispensing mechanism 6 that performs dispensation of a luminescent reagent, which reacts with ATP to cause light, into the containers 2 held in the holder 3, or the like.

Figure 2:
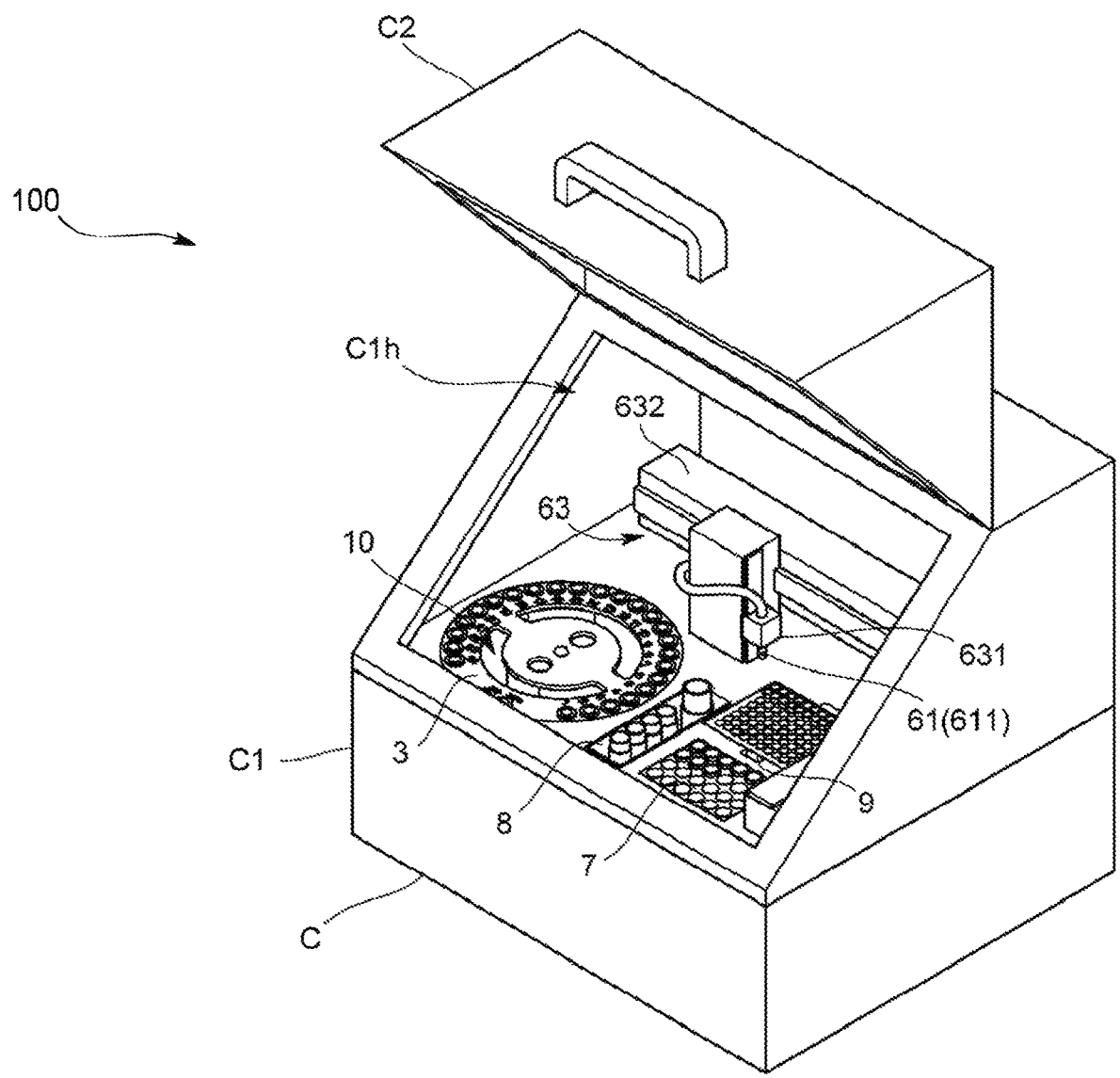
FIG. 2 is a perspective view illustrating the appearance of the biological sample analyzing device in the same embodiment.
Figure 3:
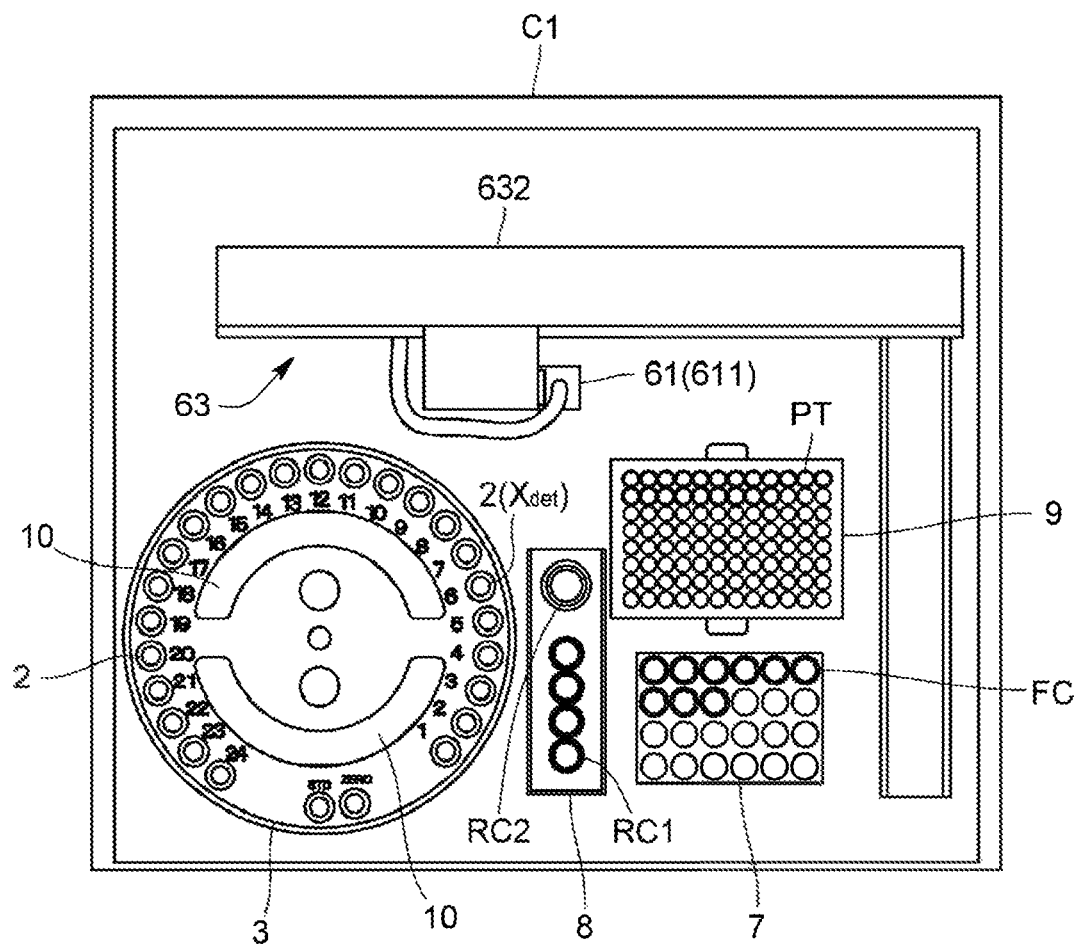
FIG. 3 is a plan view illustrating the arrangement of respective parts of a device main body in the same embodiment.

In addition, as illustrated in FIG. 2 and FIG. 3, the sample analyzing device 100 of the present embodiment includes a casing C having a door C2 for taking in/out the holder 3. The casing C includes: a casing main body C1 for containing measurement system equipment necessary for the ATP measurement, such as the holder 3, the holder driving mechanism 5, and the dispensing mechanism 6; and the door C2 provided to the casing main body C1. Also, the casing main body C1 has an opening part C1h at the front. In addition, the door C2 is provided openably/closably with respect to the opening part C1h of the casing main body C1. Specifically, it is adapted to be openable/closable by a horizontal connecting shaft (not illustrated) in the upper part of the opening part C1h, and by raising the door C2 upward, a user can access the inside of the casing main body C1. Note that in a state where the door C2 is closed, a seal member (not illustrated) makes a seal between the door C2 and the opening part C1h to thereby bring the inside of the casing C into a dark room state.

Besides, the casing main body C1 is provided with: a temperature control mechanism 7 that holds multiple specimen tubes FC containing specimens and performs temperature control; a reagent set part 8 in which reagent containers RC1, RC2 containing respective reagents are set; and a pipette tip set part 9 in which pipette tips PT used by the dispensing mechanism 6 are provided.

The temperature control mechanism 7 is one that contains and holds the multiple specimen tubes FC, for example, in a matrix. The temperature control mechanism 7 includes: a holder block 71 that holds the specimen tubes FC and is made of metal (e.g., made of aluminum); a heat source part 72 provided to the holder block 71, such as a heater; and a temperature sensor 73 for detecting the temperature of the holder block 71, such as a thermocouple. On the basis of the detected temperature by the temperature sensor 73, the heater 72 as the heat source part is controlled by a controller COM so that the temperature of the holder block 71 reaches a predetermined temperature.

The reagent set part 8 is one in which the reagent containers RC1 containing pretreatment reagents for performing pretreatment on a specimen and the reagent container RC2 containing the luminescent reagent are set. The pretreatment reagents are an ATP scavenger that scavenges ATP (free ATP) other than living cells (live bacteria) contained in the specimen, an ATP extracting agent that extracts ATP from the living cells, and the like.

Figure 4:
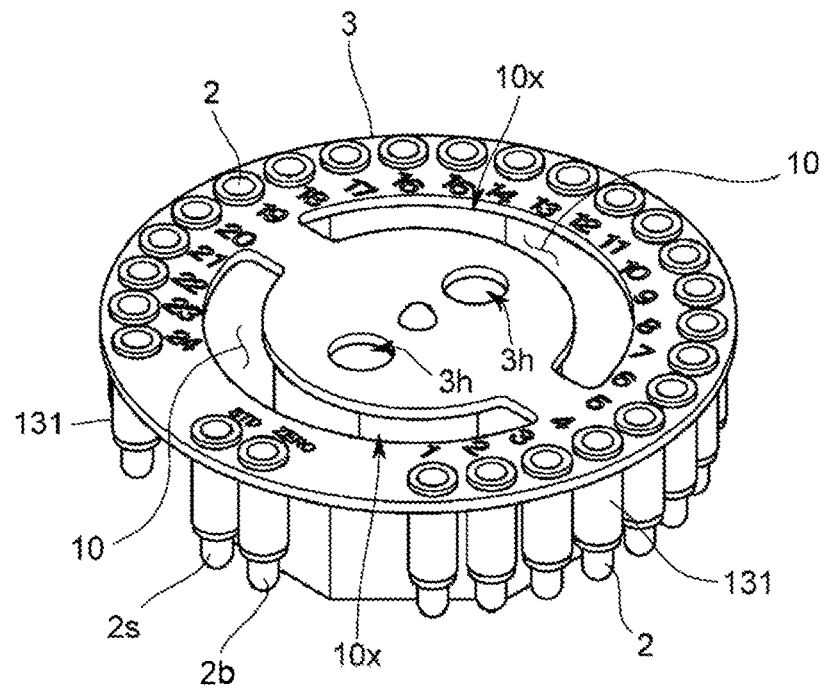
FIG. 4 is a perspective view illustrating a holder that holds multiple containers in the same embodiment.
Figure 5:
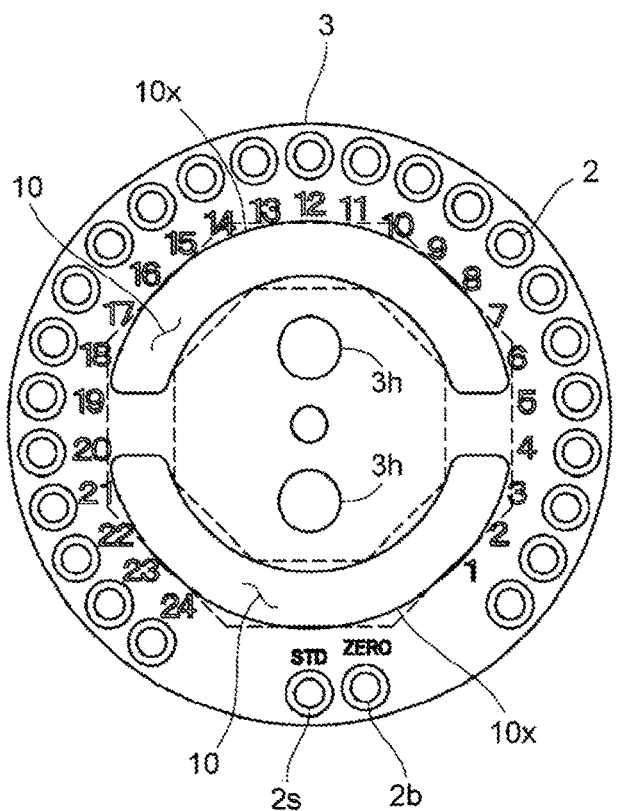
FIG. 5 is a plan view illustrating the holder that holds the multiple containers in the same embodiment.

As illustrated in FIG. 4 and FIG. 5, the holder 3 is one that holds the multiple containers 2 in a circular ring-shaped manner, and specifically, one that holds them on the same circle with respect to a predetermined rotation center. The holder 3 in the present embodiment holds, in addition to the multiple containers 2 for sample measurement, a container 2b for blank measurement and a container 2s for standard solution measurement as well. Also, the holder 3 is configured to be attachable/detachable with respect to a device main body, and for ease of the attachment/detachment operation, formed with multiple (two in this case) holding holes 3h for holding. Further, the containers 2 are ones of a bottomed tubular shape, and in the present embodiment, ones of a bottomed circular tube shape.

As illustrated in FIG. 1, the photodetector 4 is one that detects light emitted from the sample in a container 2 held in the holder 3, and for example, a photomultiplier (PMT). The photodetector 4 is provided on the lower side than the container 2 held in the holder 3. In addition, above the photodetector 4, an optical system 12 having a reflector 11 for guiding the light emitted from the sample in the container 2 to the photodetector 4 is provided. The reflector 11 is configured to be movable back and forth with respect to the container 2 positioned above them. By bringing the reflector 11 close to the container 2, the light emitted from the sample in the container 2 can be efficiently guided to the photodetector 4, and also by bringing the reflector 11 away from the container 2, the movement of the container 2 can be prevented from being obstructed. In addition, the rest of the optical system 12 including the reflector 11 or the photodetector 4 may also be configured to be movable back and forth with respect to the container 2.

The holder driving mechanism 5 is one that moves the holder 3 to sequentially position the respective containers 2 held in the holder 3 at a detection position $X_{det}$ by the photodetector 4. Specifically, the holder driving mechanism 5 is one that rotates the holder 3 around the predetermined rotation center, and as illustrated in FIG. 1, includes: a mounting table 51 on which the holder 3 is mounted; a rotary shaft 52 for rotating the holder 3 mounted on the mounting table 51; and an actuator 53 for rotating the rotary shaft 52. In addition, the holder driving mechanism 5 is provided with a rotational position sensor (not illustrated) for detecting the rotational position of the holder 3. On the basis of a detection signal of the rotational position sensor, the actuator 53 is rotationally controlled by the controller COM so as to position a container 2 to be measured at the detection position $X_{det}$.

As illustrated in FIG. 1 to FIG. 3, the dispensing mechanism 6 includes: a nozzle 61 for sucking or discharging the sample or each reagent; a pump mechanism 62 that drives the suction or discharge through the nozzle 61 via a flow path connected to the nozzle 61, such as a syringe; and a nozzle moving mechanism 63 that moves the nozzle 61 in a predetermined direction.

The nozzle 61 includes a tip holder 611 for attachably/detachably holding a pipette tip PT for contacting with the sample or each reagent to hold it. The tip holder 611 is one formed with an internal flow path, of which the base end part is connected with the flow path and the tip opening part is connected with the pipette tip PT.

Also, the nozzle moving mechanism 63 is one that linearly moves the nozzle 61 in the horizontal direction (an X-axis direction and a Y-axis direction), as well as linearly moves the nozzle 61 in the vertical direction (a Z-axis direction). Specifically, the nozzle moving mechanism 63 includes: a movable member 631 that holds the nozzle 61; slide mechanisms 632 that are respectively provided in the X-axis direction, the Y-axis direction, and the Z-axis direction; and an actuator 633 for moving the movable member 631 along the slide mechanisms 632 in the respective directions. The actuator 633 and the pump mechanism 62 are controlled by the controller COM, and thereby respective operations in the ATP measurement are performed. In addition, the respective operations in the ATP measurement of course include the attachment and detachment of a pipette tip PT with respect to the tip holder 611.

As illustrated in FIG. 1, the sample analyzing device 100 further includes a light shielding mechanism 13 that, while guiding light emitted from the sample in a container 2 at the detection position $X_{det}$ to the photodetector 4, prevents light from the sample in the other containers 2 (specifically, containers 2 after the end of the measurement) from being guided to the photodetector 4.

The light shielding mechanism 13 includes: container side light shielding parts 131 provided to the respective containers 2; and a movable side light shielding part 132 that moves back and forth with respect to a container 2 at the detection position $X_{det}$.

The container side light shielding parts 131 are ones that are formed of members not having optical transparency and cover the entire circumferences of the upper parts of the respective containers 2. The present embodiment is configured to cover the entire circumference of the upper part of a container 2 held in the holder 3 with a container side light shielding part 131 by providing a container holding part of the holder 3 with the container side light shielding part 131 of a cylindrical shape and containing the container 2 in the container side light shielding part 131.

The movable side light shielding part 132 is one that is formed of a member not having optical transparency and covers the entire circumference of a lower part other than the upper part covered with a container side light shielding part 131 in a container 2 at the detection position $X_{det}$. The movable side light shielding part 132 moves up and down between a light shielding position to cover the lower part of the container 2 at the detection position $X_{det}$ and a withdrawal position that is separated downward from the lower part of the container 2 and at which when the holder 3 moves, the movement is not obstructed. In addition, the up-and-down movement of the movable side light shielding part 132 is performed by a lifting and lowering device 14 using, for example, an actuator. The lifting and lowering device 14 is controlled by the controller COM in conjunction with the operations of the holder driving mechanism 5 and the dispensing mechanism 6.

Further, in the sample analyzing device 100 of the present embodiment, a disposal box 10 as a disposed tip containing part for disposing of a pipette tip PT of the dispensing mechanism 6 is provided integrally with the holder 3. Specifically, the disposal box 10 is provided on the inner side of the multiple containers 2, which serves as a dead space in the holder 3. The disposal box 10 has arc-shaped openings 10x along the arrangement direction of the multiple containers 2 in a plan view. The shape of the disposal box 10 in the plan view is a substantially octagonal ring shape illustrated in FIG. 5, but may be another shape such as a circular ring shape.

This holder 3 is formed with holding holes 3h for inserting fingers for holding on the inner side of the arc-shaped openings 10x. This configuration allows the disposal box 10 and the containers 2 to be positioned on the outer side of a hand for the holding in a state where the holder 3 is held using the holding holes 3h, making it possible to easily prevent careless contact with a disposed pipette tip PT and a measured container 2.

In addition, a pipette tip PT used for the dispensation is detached above the disposal box 10 of the holder 3. Specifically, it may be performed by moving the nozzle 61 to a tip detachment member (not illustrated) arranged above the disposal box 10 or it may be performed by providing the movable member 631 with a tip detachment member and moving the movable member 631 above the disposal box to then use the tip detachment member.

Also, when detaching each pipette tip PT, the controller COM controls the holder driving mechanism 5 and the dispensing mechanism 6 so as to prevent pipette tips PT from being unevenly distributed in one position of the disposal box 10. As a control mode for this, (1) every time a pipette tip PT is detached, the holder 3 is rotated by a predetermined angle to change a disposal position with respect to the disposal box 10, (2) disposal positions of a predetermined number of pipette tips PT are made the same, and every time a predetermined number of pipette tips PT are detached, predetermined angel rotation is performed to change a disposal position with respect to the disposal box 10, and the like are conceivable. Controlling in this manner enables pipette tips PT disposed of into the disposal box 10 to be wholly dispersed, making it possible to prevent them from being unevenly distributed in one position to get out of the disposal box 10.

<Analysis Method>

Next, an analysis method will be described together with the operation of the sample analyzing device 100 configured as described.

For example, a large volume (e.g., 50 ml to 200 ml) of specimen is condensed to a predetermined amount (e.g., 1 µl to 1000 µl) to prepare a sample. Specimen tubes FC containing the sample are set in the temperature control mechanism 7. The door C2 is closed with a predetermined number of specimen tubes FC set, and measurement is started. In addition, in this state, although respective containers 2 held in the holder 3 are empty, a container 2 for standard solution measurement contains standard solution whose ATP content is known.

When the measurement is started, the controller COM controls the dispensing mechanism 6 to dispense the respective pretreatment reagents into each of the specimen tubes FC held in the temperature control mechanism 7 in accordance with a predetermined sequence. In doing so, the predetermined pretreatment (ATP extraction) is performed on the sample in the specimen tubes FC. After that, the dispensing mechanism 6 introduces the pretreated sample in the respective specimen tubes FC into the respective containers 2 held in the holder 3. Note that a pipette tip PT is replaced for each of the reagents, and a used pipette tip PT is disposed of into the disposal box 10.

Then, the controller COM controls the holder driving mechanism 5 to move a container 2 to be measured to the detection position $X_{det}$. After moving the container 2 to be measured to the detection position $X_{det}$, the controller COM controls the lifting and lowering device 14 to move the movable side light shielding part 132 of the light shielding mechanism 13 to the light shielding position. After setting this state, the controller COM controls the dispensing mechanism 6 to introduce the luminescent reagent into the container 2 at the detection position $X_{det}$. This allows light emitted from the sample in the container 2 at the detection position $X_{det}$ to be detected by the photodetector 4. A light intensity signal obtained by the photodetector 4 is subjected to arithmetic processing by the controller COM to calculate ATP content (amol). What used for the arithmetic processing out of the light intensity signal obtained by the photodetector 4 is an integrated signal until a predetermined time (e.g., for a few seconds) after a point in time when the luminescent reagent is introduced.

After the end of the luminescence measurement of the one container 2, the controller COM controls the lifting and lowering device 14 to move the movable side light shielding part 132 of the light shielding mechanism 13 to the withdrawal position, and then controls the holder driving mechanism 5 to move a container 2 to be measured next to the detection position $X_{det}$. In this manner, the luminescence measurement of the sample in the respective containers 2 is performed in sequence. Note that before the luminescence measurement of the respective containers 2, the blank measurement and the standard solution measurement are performed to perform zero point calibration and span calibration. In addition, a pipette tip PT is replaced every time the luminescent measurement of the sample in each container 2 is performed, and a used pipette tip PT is disposed of into the disposal box 10.

After ending the measurement of all pieces of the sample in this manner, the door C2 is opened to replace the specimen tubes FC held in the temperature control mechanism 7, as well as to replace the containers 2 held in the holder 3. When replacing the containers 2 held in the holder 3, the holder 3 is detached from the device main body while holding the holding holes 3h of the holder 3. Regarding the holder 3, used and disposed pipette tips PT are in the disposal box 10 of the holder 3, and therefore by detaching the holder 3 from the device main body, the disposed pipette tips PT can also be simultaneously taken out of the device main body.

Effects of the Present Embodiment

According to the sample analyzing device 100 of the present embodiment configured as described, since the disposal box 10 is provided to the holder 3, the disposal box 10 is taken in/out together with the holder 3 via the door C2. As a result, the need for providing the device main body with a drawer structure for drawing the disposal box 10 is eliminated, making it possible to surely shield external light. Also, in addition to eliminating the need for the drawer structure, the dead space other than the container holding part of the holder 3 can be effectively used, and therefore the device 100 can be made compact.

Other Embodiments

Note that the present invention is not limited to the above-described embodiment.

For example, the holder 3 is one that holds the multiple containers 2 in a circular ring-shaped manner, but may be one that holds them in a ring-shaped manner so that the arrangement of the multiple containers 2 is of a rectangular shape, a polygonal shape, or an elliptical shape.

Also, in the above-described embodiment, the disposal box 10 is one having the two openings 10x, but may be one having one or three or more openings 10x.

Figure 6:
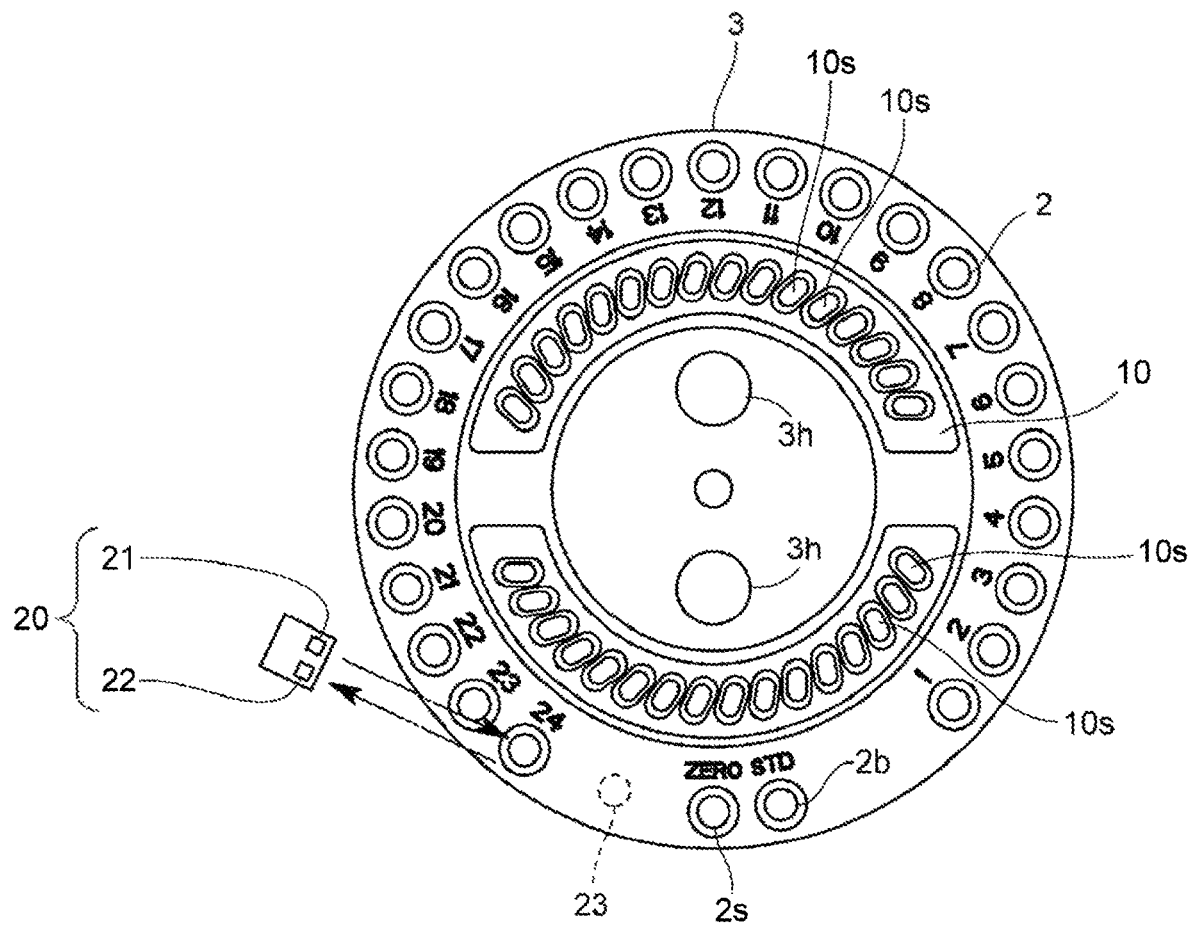
FIG. 6 is a plan view illustrating a holder that holds multiple containers in a variation.
Figure 7:
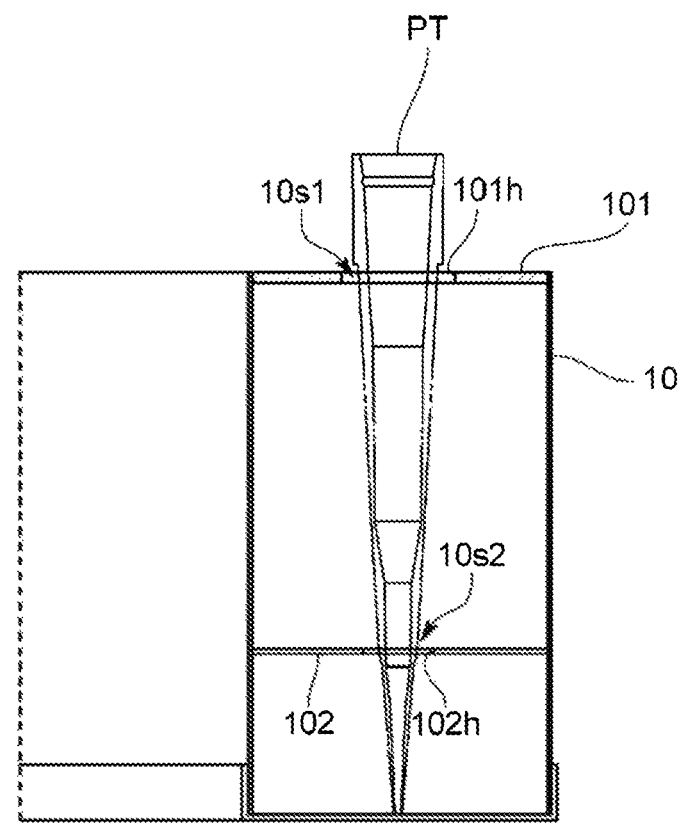
FIG. 7 is a cross-sectional view schematically illustrating a disposal space in the variation.

As illustrated in FIG. 6, in the disposal box 10, disposal spaces 10s are separated for each pipette tip PT to be disposed of. As illustrated in FIG. 7, a disposal space 10s includes: an opening part 10s1 opened in the upper surface of the disposal box 10; and a narrowed part 10s2 that is formed vertically below the opening part 10s1 and whose opening area is smaller than the opening part 10s1. In this example, the opening part 10s1 of each of the disposal spaces 10s is configured by forming a through-hole 101h in an upper face plate 101 of the disposal box 10, and the narrowed part 10s2 of each of the disposal spaces 10s is configured by forming a through-hole 102h in an intermediate plate 102 provided inside the disposal box 10.

Since the disposal spaces 10s are separated for each of the pipette tips PT as described, a pipette tip PT already disposed of is never obstructive, and a pipette tip PT can be smoothly disposed of. Also, since pipette tips PT disposed of into the disposal box 10 are in a state of being mutually separated, the work of taking out disposed pipette tips PT from the disposal box 10 is facilitated, and further, for example, the work of removing waste liquid remaining in pipette tips PT from the pipette tips PT is also facilitated. In addition, since each of the disposal spaces 10s has the narrowed part 10s2, a pipette tip PT can be prevented from tilting in each of the disposal spaces 10s, making it possible to facilitate the work of taking out disposed pipette tips PT from the disposal box 10.

In addition, the through-hole 101h and the through-hole 102h are of a long hole shape, whose longer direction is aligned with a direction along a slide direction of the below-described tip detachment member. This makes it easy to put a pipette tip PT taken out of the nozzle 61 into a disposal space 10s.

Further, FIG. 6 illustrates a count mechanism 20 for counting containers 2 held in the holder 3. The count mechanism 20 is one of a light reflection type, and includes: a light source 21 that irradiate a passage area for containers 2 with light; and a photodetector 22 that detects light reflected by a container 2 passing through the passage area. Note that the irradiation direction of the light of the light source 21 is set so as to prevent the light from the light source 21 from irradiating the disposal box and so as to irradiate only one container 2. In addition, the count mechanism 20 may be one of a light transmission type.

Also, the holder 3 is provided with a detected part 23 for detecting whether or not the holder 3 is attached to the device main body, i.e., the presence or absence of the holder 3. The detected part 23 is one that, for example, reflects light, and can be made of metal, ceramic, resin, or the like. The detected part 23 is one that is provided on the lower surface of the holder and of a dummy shape simulating a container 2 held in the holder 3. The presence or absence of the detected part 23 is detected by a light source and a photodetector provided to the device main body. The light source and the photodetector can be configured of the above-described count mechanism 20. This configures a detection mechanism for detecting the presence or absence of the holder 3. Also, this detection mechanism can also detect the presence or absence of the disposal box 10. Further, the detection mechanism can specify a number where no container 2 is placed, such as which number where no container 2 is placed among container numbers (in FIGS. 6, 1 to 24) set on the holder 3, and count the total number of containers 2 held in the holder 3. Still further, these results can also be displayed on a display and on the basis of these results, error notification can also be given.

Figure 8:
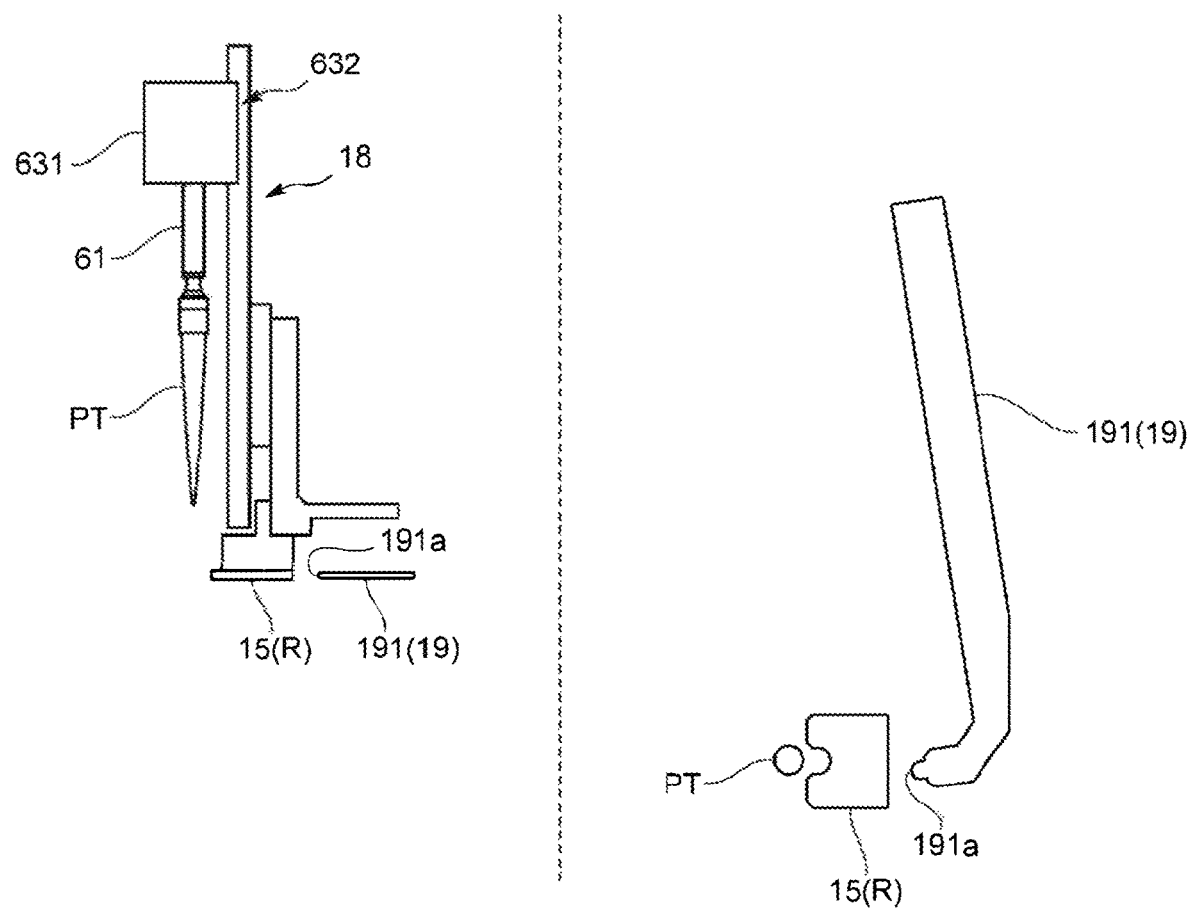
FIG. 8 is a schematic diagram illustrating a tip detachment mechanism (withdrawal position R) in a variation.
Figure 9:
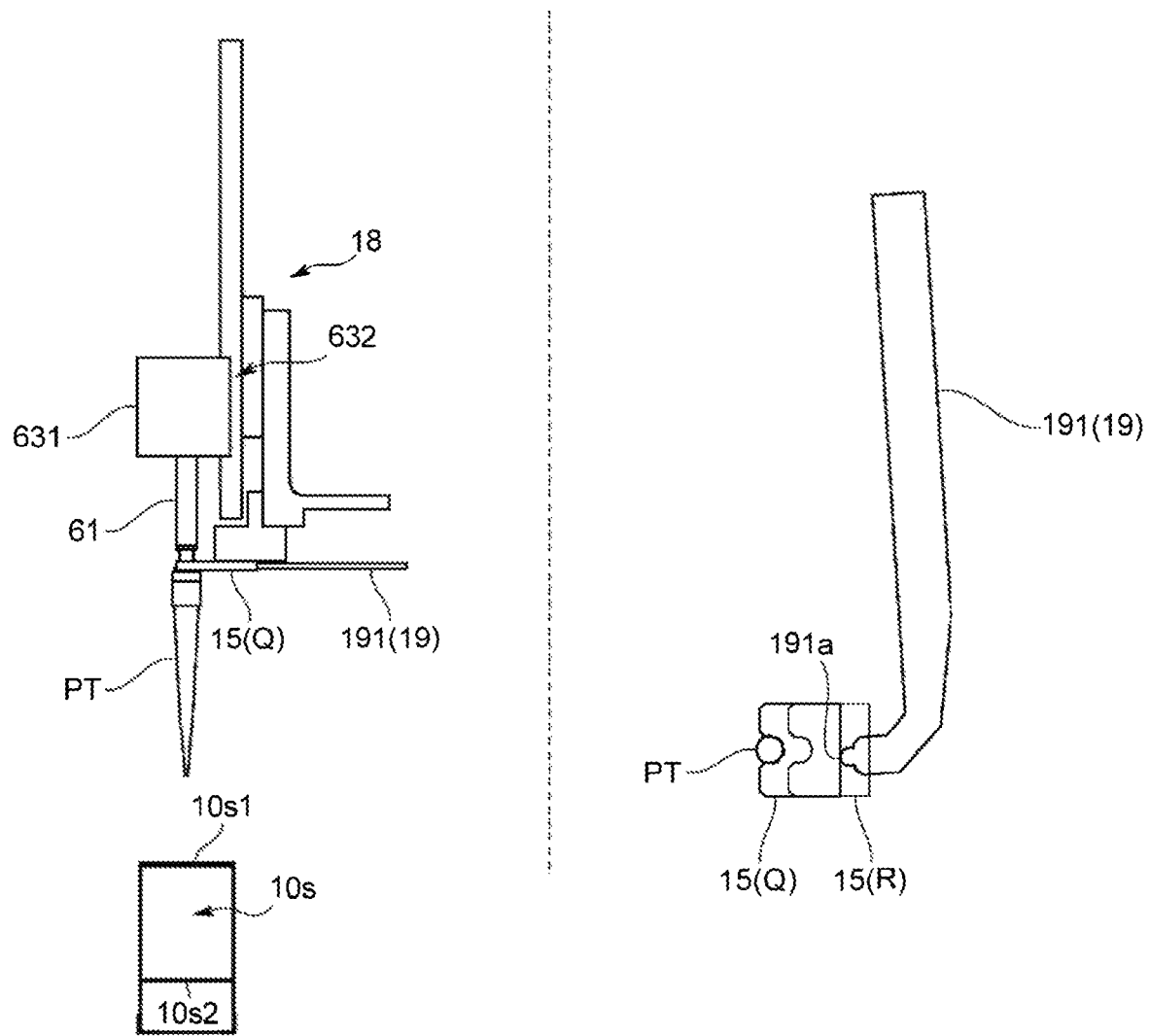
FIG. 9 is a schematic diagram illustrating the tip detachment mechanism (detachment position Q) in the variation.

In addition, in the sample analyzing device 100, as illustrated in FIG. 8 and FIG. 9, the nozzle 61 and the tip detachment member 15 may be configured to integrally move in the horizontal direction (the X-axis direction and the Y-axis direction).

Specifically, the sample analyzing device 100 includes: a holding unit 18 that holds the nozzle 61, as well as moves in the horizontal direction; the tip detachment member 15 that is provided to the holding unit 18 to move together with the nozzle 61; and an actuator 19 that is provided separately from the holding unit 18 and operates the tip detachment member 15.

The holding unit 18 is adapted to be movable in the horizontal direction by an unillustrated slide mechanism. Also, the holding unit 18 includes the slide mechanism 632 that slides the movable member 631 holding the nozzle 61 in the Z-axis direction.

The tip detachment member 15 is provided in the holding unit 18 slidably between a detachment position Q (see FIG. 9) to detach a pipette tip PT attached to the nozzle 61 and a withdrawal position R (see FIG. 8) withdrawn therefrom. The tip detachment member 15 is biased to the withdrawal position R by an unillustrated elastic body, and when not detaching a pipette tip PT, positioned in the withdrawal position R. In the horizontal direction, the position of the tip detachment member 15 (the detachment position Q, the withdrawal position R) and the position of the nozzle 61 are constantly fixed (constant) regardless of the horizontal movement of the holding unit 18.

The actuator 19 is one that operates the tip detachment member in a state where the holding unit 18 is in a predetermined position. Note that the predetermined position refers to a position where the nozzle 61 (a pipette tip PT) is above a disposal space 10s. The actuator 19 has an arm 191 for moving the tip detachment member 15. The tip 191a of the arm 191 is formed in, for example, a semicircular shape so that a contact area with the tip detachment member 15 decreases. The arm 191 may be driven by a drive part such as a cylinder, or the arm 191 may be configured to be driven by abutting on a fixed member along with the movement of the holding unit. The actuator 19 drives the arm 191 in a state where the nozzle 61 in the holding unit 18 is moved to a Z-axis directional position for detaching a pipette tip PT. The tip detachment member 15 is moved from the withdrawal position R to the detachment position Q by the driven arm 191 and a pipette tip PT is detached from the nozzle 61 and drops into a disposal space 10s.

The respective opening parts 10s1 of the above-described multiple disposal spaces 10s are independently formed; however, the opening parts 10s1 of the respective disposal spaces 10s may be continuously configured. Even in this case, each pipette tip PT is adapted to be contained in a disposal space 10s in an upright state. That is, the upper openings of the disposal box are formed with concavo-convex structures for separating and arranging respective pipette tips. Besides, the disposal box 10 may be configured to be separated into multiple disposal spaces in a plan view, so that one or more pipette tips PT are disposed of into each of the disposal spaces.

Further, the dead space other than the container holding part in the holder is not required to be on the inner side of multiple containers as in the above-described embodiment, and when a dead space is formed on the outer side of multiple containers in the holder, the disposal box may be provided on the outer side of the multiple containers.

In addition, in the above-described embodiment, the disposal box is provided to the holder; however, the disposal box may be configured to be provided separately from the holder and to be taken in/out via the door C2 by itself.

Further, in the above-described embodiment, as an example of the sample analyzing device, the ATP content measuring device is described; however, as long as a sample analyzing device is one that analyzes another sample and uses a disposable pipette tip, it is applicable.

Besides, it goes without saying that the present invention is not limited to the above-described embodiment, but can be variously modified without departing from the scope thereof.

INDUSTRIAL APPLICABILITY

According to the present invention, an improvement in analysis accuracy can be achieved.

The invention claimed is:

1. A sample analyzing device that measures light emitted by introducing a reagent to a sample contained in a container to analyze the sample, the sample analyzing device comprising:
    a holder that holds the container;
    a casing that has a door for taking in/out the holder;
    a pipette tip set part, arranged in the casing, in which a plurality of pipette tips for injecting the reagent into the container are provided;
    a nozzle to/from which a pipette tip of the plurality of pipette tips provided in the pipette tip set part can be attached/detached;
    a photodetector that measures the light emitted from the sample in the container supported by the holder; and
    a disposal box into which the pipette tip after injection is disposed of, wherein
    the disposal box is configured to be arranged separately from the pipette tip set part in the casing and to be taken in/out via the door,
    the holder is configured to hold multiple containers in a circular ring-shaped configuration,
    the holder is configured to rotate around a predetermined rotation center,
    the disposal box is provided to the holder, wherein the disposal box is provided on an inner side of the multiple containers in the holder,
    the disposal box has an arc-shaped opening along an arrangement direction of the multiple containers in a plan view,
    the disposal box is rotated integrally with the holder around the predetermined rotation center,
    in the disposal box, a plurality of disposal spaces are separated for each of the plurality of pipette tips to be disposed of,
    the disposal box has, above a bottom plate, an upper face plate and an intermediate plate, each of the upper face plate and intermediate plate being respectively formed with a plurality of through-holes, the plurality of through-holes having at least two dimensions of different lengths in the plan view and extending along a part of the longer one of the at least two dimensions with a uniform width,
    each of the plurality of through-holes in the upper face plate forms an opening for the plurality of disposal spaces for each of the plurality of pipette tips,
    when disposed of in one of the plurality of disposal spaces, a tip end of each pipette tip is supported by the bottom plate, and a side surface of the pipette tip is supported by an inner wall of one of the plurality of through-holes, and
    the plurality of through-holes are arranged such that a centrifugal force due to the rotation of the holder is applied to each of the pipette tips disposed therein towards a longer one of the at least two dimensions of each of the plurality of through-holes.

2. The sample analyzing device according to claim 1, wherein
    each of the plurality of disposal spaces has: an opening part opened in an upper surface of the disposal box; and a narrowed part that is formed below the opening part and whose opening area is smaller than the opening part.

3. The sample analyzing device according to claim 1, comprising:
    a holding unit that holds the nozzle, as well as moves in a horizontal direction;
    a tip detachment member that is provided in the holding unit to move together with the nozzle, and moves between a detachment position to detach the pipette tip attached to the nozzle and a withdrawal position withdrawn therefrom; and
    an actuator that, in a state where the holding unit is in a predetermined position, operates the tip detachment member to move the tip detachment member from the withdrawal position to the detachment position.

4. The sample analyzing device according to claim 1, comprising
    a detection mechanism configured to detect a presence or an absence of the disposal box in the casing.

5. The sample analyzing device according to claim 1, comprising:
    a tip detachment member that detaches the pipette tip from the nozzle, configured to slide between a detachment position for detaching the pipette tip and a withdrawal position for withdrawal when not detaching the pipette tip, wherein
    the plurality of through-holes are arranged such that the longer one of the at least two dimensions of each through-hole is aligned with a slide direction of the tip detachment member.

6. The sample analyzing device according to claim 1, wherein the plurality of disposal spaces are separated from the multiple containers in a radial direction.

7. The sample analyzing device according to claim 1, wherein the uniform width of the through-holes in the upper face plate is greater than the uniform width of the through-holes in the intermediate plate.

8. The sample analyzing device according to claim 1, wherein the through-holes in the intermediate plate are smaller in each of the two dimensions than the through-holes in the upper face plate.

* * * * *